United States Patent [19]

Inaba et al.

[11] Patent Number: 5,382,981
[45] Date of Patent: Jan. 17, 1995

[54] VIDEO MUTING APPARATUS

[75] Inventors: Hitoshi Inaba; Hidenobu Kimura, both of Saitama, Japan

[73] Assignee: Kabushiki Kaisha Toshiba, Kawasaki, Japan

[21] Appl. No.: 74,442

[22] Filed: Jun. 10, 1993

[30] Foreign Application Priority Data

Jun. 15, 1992 [JP] Japan .................. 4-154924

[51] Int. Cl.6 .............................. H04N 3/24
[52] U.S. Cl. .................... 348/634; 348/637
[58] Field of Search .......... 358/165, 33, 190, 181–183; 455/174.1, 194.1; H04N 3/24; 348/632, 633, 634, 637, 635

[56] References Cited

U.S. PATENT DOCUMENTS 4,107,614  8/1978  Sugai .................. 358/165
4,280,139  7/1981  Mogi et al. ............. 358/165
4,330,792  6/1982  Naimpally ............. 358/165

Primary Examiner—James J. Groody
Assistant Examiner—Glenton B. Burgess
Attorney, Agent, or Firm—Cushman, Darby & Cushman

[57] ABSTRACT

The video muting apparatus is provided with a controlling apparatus which calculates the video muting time TM from the correlation between the power feeding time T1 counted by the first counter and the power feed stopping time T2 counted by the second counter and controls the operation of the switch on the basis of the calculated video muting TM. The switch will operate to be opened on the basis of the controlling signal from the controlling apparatus during the period from the starting time point when the power feed by the power supply circuit is started until the video muting time TM elapses and will operate to be closed on the basis of the controlling signal from the controlling apparatus immediately after the the video muting time TM elapses.

2 Claims, 3 Drawing Sheets

VIDEO MUTING APPARATUS

BACKGROUND OF THE INVENTION

1. Field of the Invention

This invention relates to a video muting apparatus which is used in a television receiver having a displaying means consisting of a picture tube and controls the time of starting a video signal feeding operation of feeding a video signal to this picture tube.

2. Description of the Related Art

Generally, in a television receiver having a displaying means consisting of a picture tube, the time of starting a video signal feeding operation of feeding a video signal to the picture tube is controlled. In a controlling system for controlling the time of starting this video signal feeding operation, the operation of feeding the video signal to the picture tube will be stopped during the period from the time of inputting the power source of the television receiver until the channel selection is completed and will be started immediately after the stopping period ends.

When the period from the power source input until the channel selection is completed is short, the cathode electrode of the image receiving tube will not be heated by a heater up to a predetermined temperature and the video signal feeding operation will be started while the cathode electrode is not heated up to the predetermined temperature. When the video signal feeding operation is started while the temperature of the cathode electrode is low, the cathode electrode will be subjected to a large load and will be likely to deteriorate. As a result, a color slip or the like or the video will be caused by the deterioration of the cathode electrode and the quality of the video displayed in the picture tube will remarkably reduce.

In order to prevent the deterioration of the cathode electrode, it is considered to add a capacitor of a large capacity or the; like to the circuit and to elongate the period from the power source input until the video signal feeding to the picture tube is started. Then, the capacitor will become so large that the cost will increase and the circuit scale will become large. The rising time until the video is displayed in the picture tube will be always long and the rising performance will reduce.

As described above, in the controlling system for controlling the time of starting the operation of the video signal feeding to the picture tube in the conventional television receiver, the cathode electrode will be likely to deteriorate and the quality of the video will be likely to be remarkably reduced by the deterioration of the cathode electrode.

OBJECTS AND SUMMARY OF THE INVENTION

An object of the present invention is to provide a video muting apparatus wherein, without reducing the rising performance until a video is displayed in a picture tube, the reduction of the video quality can be prevented from being caused by the deterioration of the cathode electrode.

Another object of the present invention is to provide a video muting apparatus wherein tile video muting time can be simply calculated.

The present invention is a video muting apparatus which is used in a television receiver having a picture tube in which a cathode electrode will be started to be heated substantially simultaneously with inputting a power source and controls the time of starting the operation of feeding a video signal to this picture tube, comprising a first counting means counting the time of inputting the power source from the input of the power source into tile television receiver until the next power source interruption, a second counting means counting the time of interrupting the power source from the interruption of the power source in the television receiver until the next power source input and a controlling means calculating the video muting time from the correlation between the power source inputting time counted by the first counting means and the power source interrupting time counted by the second counting means and controlling the video signal feeding operation so that the feed of tile video signal to the picture tube may be stopped during the period from the time of inputting the power source into the television receiver until the video muting time elapses.

In the video muting apparatus of the present invention, the video muting time is calculated from the correlation between the power source inputting time and the power source interrupting time and the video signal feeding operation is controlled so that the feed of the video signal to the picture tube may be stopped during the period from the time of inputting the power source into the television receiver until the video muting time elapses.

When the power source is input into the television receiver, the cathode electrode of the picture tube will be heated during the period from the time of inputting the power source until the video muting time elapses. As the video muting time is calculated from the correlation between the power source interrupting time before the power source is now input and the last power source inputting time, the time required to heat the cathode electrode of the picture tube from the present temperature up to a predetermined temperature is presumed to be the video muting time and the cathode electrode of the picture tube will be heated up to the predetermined temperature from the time of inputting the power source into the television receiver until after the video muting time elapses.

Therefore, the abrupt rise of the lead applied to the cathode electrode of the picture tube will be inhibited and the deterioration of the cathode electrode will be controlled. Also, by setting the video muting time so as not to exceed the allowable value of the rising time until the video is displayed in the picture tube, the reduction of the rising performance determined by this video muting time will be controlled. When the power source inputting time counted by the first counting means is represented by $T1$, the power source interrupting time counted by the second counting means is represented by $T2$, the maximum allowable time taken from the power source input into the television receiver until the video signal feed to the picture tube starts is represented by $K$, the video muting time is represented by $TM$ and the power source inputting time $T1$ and power source interrupting time $T2$ satisfy the relation of the following formula (1), the video muting time $TM$ will be determined by the following formula (2):

$$\{\text{Log } 2\ (T1) - \text{Log } 2\ (T2)\} \geq 0 \quad (1)$$

$$TM = K - \{\text{Log } 2\ (T1) - \text{Log } 2\ (T2)\} \quad (2)$$

and, when the power source inputting time T1 and power source interrupting time T2 satisfy the relation of the following formula (3), tile video muting time TM will be determined by the following formula (4):

$$\{\text{Log } 2 \ (T1) - \text{Log } 2 \ (T2)\} < 0 \quad (3)$$

$$TM = K \quad (4)$$

By using the above described formulae (1) to (4), the video muting time TM is simply calculated.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

DETAILED DESCRIPTION OF PREFERRED EMBODIMENTS

The embodiments of the present invention shall be explained in the following with reference to the drawings.

Figure 1:
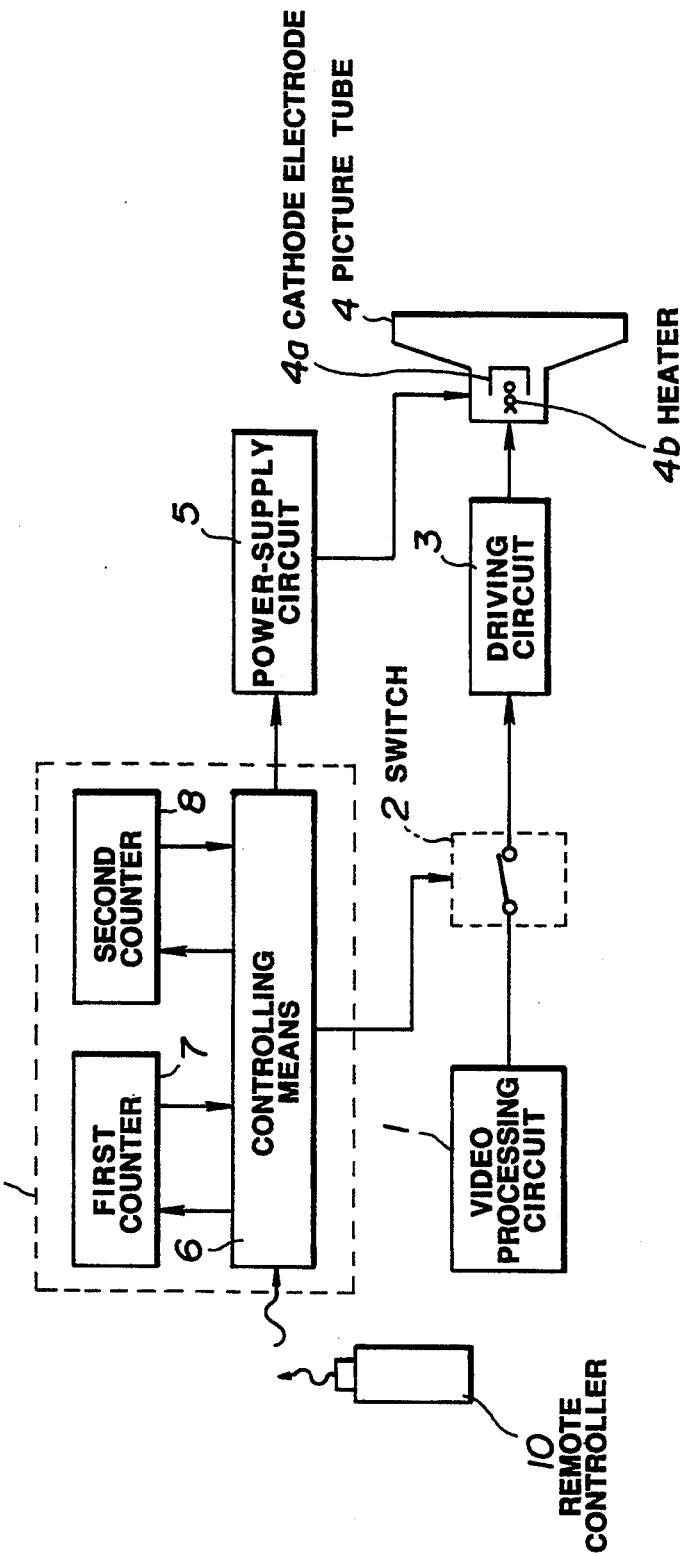
FIG. 1 is a block diagram showing a television receiver in which an embodiment of the video muting apparatus of the present invention is used.

FIG. 1 is a block diagram showing a television receiver in which an embodiment of the video muting apparatus of the present invention is used.

As shown in FIG. 1, the television receiver has a video processing circuit 1 which applies demodulating and amplifying processes to a video signal of a channel selected by a tuner. The video signal is given to a driving circuit 3 through a switch 2. The driving circuit 3 amplifies the video signal and then gives the amplified video signal to a picture tube 4.

The picture tube 4 has a cathode electrode 4a which is heated up to a predetermined temperature by a heater 4b. The video signal is given to the cathode electrode 4a and an electron discharged from the cathode electrode 4a is controlled by the video signal. A video corresponding to the video signal is displayed on a screen of the picture tube 4.

An electric power is fed to the picture tube 4 from a power supply circuit 5. Simultaneously with the input of the electric power from outside, a power supply circuit 5 will start feeding the electric power to the heater 4b or the like.

The operation of the switch 2 and the power feeding operation of the power supply circuit 5 are controlled by a controlling means 6 which monitors the power feeding operation of the power supply circuit 5. When a power feed start of the power supply circuit 5 is indicated from an outside remote controller 10, the controlling means 6 will produce a controlling signal indicating a counting operation start to the first counter 7, a controlling signal indicating a counting operation stop to the second counter 8 and a controlling signal indicating a power feed start to the power supply circuit 5. When a power feed stop of the power supply circuit 5 is indicated from the outside remote controller 10, the controlling means 6 will produce a controlling signal indicating a counting operation stop to the first counter 7, a controlling signal indicating a counting operation start to the second counter 3 and a controlling signal indicating a power feed stop to the power supply circuit 5.

The first counter 7 is a counter for counting the power feeding time T1 from the power feed start of the power supply circuit 5 to the next power feed stop and the second counter 8 is a counter for counting the power feed stopping time T2 from the power feed stop of the power supply circuit 5 to the next power feed start.

The controlling means 6 takes in the power feeding time T1 counted by the first counter 7 and the power feed stopping time T2 counted by the second counter 8 and calculates the video muting time TM from the power feeding time T1 and power feed stopping time T2. To calculate the video muting time TM, the following respective formulae are used.

When the time T1 and time T2 satisfy the relation of the following formula (1), the video muting time TM will be determined by the following formula (2):

$$\{\text{Log } 2 \ (T1) - \text{Log } 2 \ (T2)\} \geq 0 \quad (1)$$

$$TM = K - \{\text{Log } 2 \ (T1) - \text{Log } 2 \ (T2)\} \quad (2)$$

When tile time T1 and time T2 satisfy the relation of the following formula (3), the video muting time TM will be determined by the following formula (4):

$$\{\text{Log } 2 \ (T1) - \text{Log } 2 \ (T2)\} < 0 \quad (3)$$

$$TM = K \quad (4)$$

By the way, K represents the maximum allowable time taken from the start of the power feeding operation of the power supply circuit 5 to the start of the video signal feed to the picture tube 4 and is set not to exceed the allowable value of the rising time until the video is displayed in the picture tube 4. Usually, the maximum allowable time K for the protection of the cathode electrode 4a of the picture tube 4 is set to be 10 to 13 seconds.

As the video muting time TM calculated by the above described formula (2) is calculated from the correlation between the power feed stopping time T2 before the present power feed start and the last power feeding time T1, the time taken to heat the cathode electrode 4a of the picture tube 4 from the present temperature to a predetermined temperature is presumed to be the video muting time TM which well satisfies the time taken to heat the cathode electrode 4a from the present temperature to the predetermined temperature with the heater 4b.

Since binary numbers are used in the process of operating the above described formulae and a bit shift is provided as a function of the logical operation, when the base of each of the above described formulae is made "2", the process of operating the above described formulae will be simplified and the load of the operating process applied to the controlling 6 will be able to be reduced. For example, when the time T1 is made 500 seconds and is expressed by the binary method, the time T1 will be "0111110100" and, when it is bit-shifted twice to the MSB side, it will overflow. Therefore, it can be easily detected that 1 stands in the, eighth bit. As a result, it can be quickly determined that T1 is of a numerical value of 8 to 9. In the same manner, Log 2 T2 can be also easily determined and TM can be simply calculated.

The controlling means 6 controls the operation of the switch 2 on the basis of the calculated video muting time TM. During the period from the time when the power feed of the power supply circuit 5 is started until the video muting time TM elapses, the switch 2 will operate to be opened on the, basis of the controlling signal from the controlling means 6 and, immediately after the video muting time TM elapses, the switch 2 will operate to be closed on the basis of the controlling signal from the controlling means 6.

The controlling means 6 forms a video muting apparatus 9 in cooperation with the first counter 7 and second counter 8.

Figure 2:
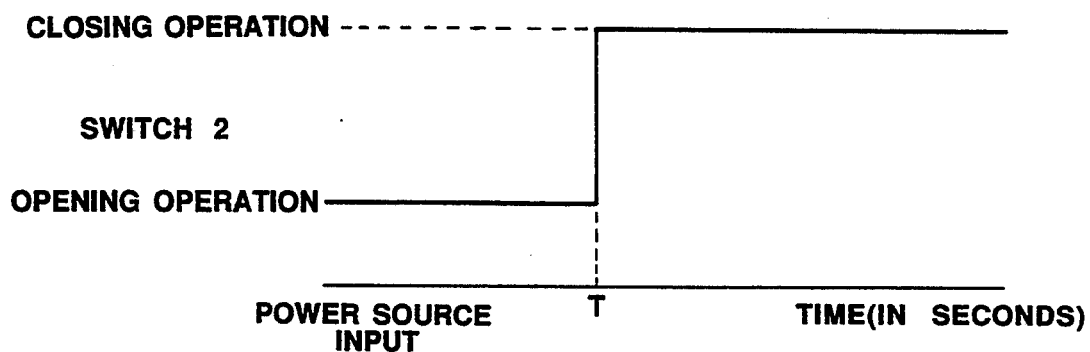
FIG. 2 is a diagram for explaining the rising operation of a television receiver by the video muting apparatus in FIG. 1.

The operation of the video muting apparatus shall be explained in the following with reference to the drawings. FIG. 2 is a diagram for explaining the rising operation of a television receiver by the video muting apparatus in FIG. 1.

When the utilizer sees a broadcast program in the television receiver, first, an indication of starting a power feeding operation of the power supply circuit 5 will be given to the controlling means 6 from the remote controller 10. The power supply circuit 5 will start the power feeding operation on the basis of the controlling signal from the controlling means 6. An operation of heating the cathode electrode 4a with the heater 4b will be started with the start of the power feeding operation of the power supply circuit 5.

Simultaneously with the start of the power feed of the power supply circuit 5, the power feeding time T1 held in the first counter 7 will be taken into the controlling means 6 and the counting operation of the first counter 7 will be started. On the other hand, the counting operation of tile second counter 8 will be stopped and the power feed stopping time T2 until the stopping time point will be taken into the controlling means 6, the controlling means 6 will calculate the video muting time TM from the power feeding time T1 counted by the first counter 7 and the; power feed stopping time T2 counted by the second counter 8.

During the period from the power feed starting time point of the power supply circuit 5 until the video muting time TM elapses, as shown in FIG. 2, the operation of the switch 2 will be held open and the cathode electrode 4a will be continued to be heated by the heater 4b. Immediately after the video muting time TM elapses, the switch 2 will operate to be closed. With the closing operation of the switch 2, a video signal will be given to the driving circuit 3. The video signal from the driving circuit 3 will be applied to the cathode electrode 4a and a vide corresponding to the video signal will be displayed on the screen of the picture tube 4.

When a luminance signal is applied to the cathode electrode 4a, as the cathode electrode 4a has been heated up to a predetermined temperature during the period from the power feed starting time point of the power supply circuit 5 until after the lapse of the video muting time TM, the cathode electrode 4a will not be abruptly subjected to a large load and will be controlled from the deterioration. The video muting time TM will become shorter than the maximum allowable time K set not to exceed the allowable value of the rising time until the video is displayed in the picture tube 4 and the rising performance determined by the video muting time TM will be controlled from the reduction. As a result, the rising performance until the video is displayed in the picture tube 4 will not be reduced and the video quality will be able to be prevented from being reduced by the deterioration of the cathode electrode 4a.

For example, when the maximum allowable time K is 10 seconds and the power source is input for 10 minutes, is then interrupted for 5 seconds and is again input, the time T1 will be 600 seconds and the time T2 will be 5 seconds. Therefore, when these values are substituted in the above described formula (2), TM will be 3 seconds. Therefore, the video muting time when the power source is input will be 3 seconds and the video muting time will be able to be shortened without damaging the cathode electrode 4a of the picture tube 4.

By the way, in this embodiment, the video muting time TM is determined by using the above described formulae (1), (2), (3) and (4). However, by using the following formulae (5), (6), (7) and (8) instead of these formulae, the video muting time will be able to be calculated at a higher precision.

When the time T1 and time T2 satisfy the relation of the following formula (5), the video muting time TM will be determined by the following formula (6):

$$\{A \text{ Log } C (T1) - B \text{ Log } C (T2)\} \geq 0 \tag{5}$$

$$TM = K - \{A \text{ Log } C (T1) - B \text{ Log } C (T2)\} \tag{6}$$

When the time T1 and time T2 satisfy the relation of the following formula (7), the video muting time TM will be determined by the following formula (8):

$$\{A \text{ Log } C (T1) - B \text{ Log } C (T2)\} < 0 \tag{7}$$

$$TM = K \tag{8}$$

By the way, the constants A, B and C in the respective formulae are constants determined by the characteristics of the cathode and heating heater or the conditions inherent to the television receiver.

Figure 3:
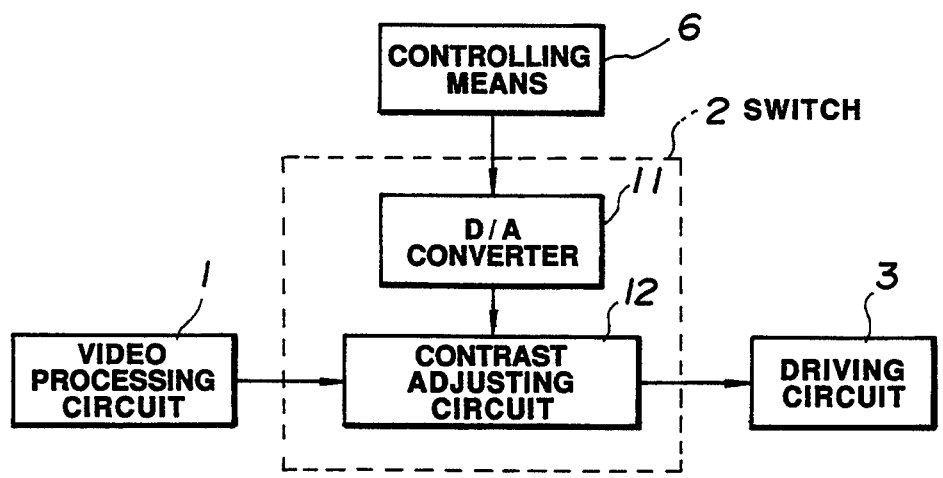
FIG. 3 is a block diagram showing an example of a switch controlled by the video muting apparatus in FIG. 1.
Figure 4:
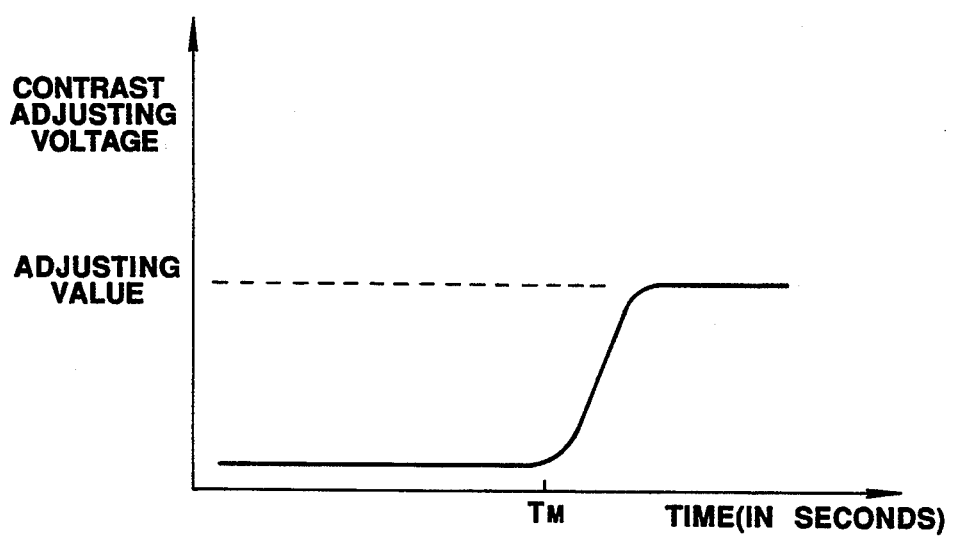
FIG. 4 is a diagram for explaining the rising operation of a television receiver by the control for the switch in FIG. 3.

A formation example of the switch 2 shall be explained in the following with reference to the drawings. FIG. 3 is a block diagram showing an example of a switch controlled by the video muting apparatus in FIG. 1. FIG. 4 is a diagram for explaining the rising operation of a television receiver by the control for the switch in FIG. 3.

As shown in FIG. 3, the television receiver is provided with the switch 2 between the video signal processing circuit 1 and the driving circuit 3. The switch 2 has a D/A converter 11 converting the controlling signal from the controlling means 6 to an analogue signal. The analogue signal from the D/A converter 11 is given to a contrast adjusting circuit 12 which adjusts the level of the video signal input on the basis of the analogue signal from the D/A converter 11 so as to be the contrast level set by the utilizer.

The controlling means 6 will output a controlling signal showing an indication of elevating the level of the contrast to a set value simultaneously with the lapse of the video muting. time from the power source input. This controlling signal will be given to the contrast adjusting circuit 12 through tile D/A converter 11. Substantially simultaneously with the input of the analogue signal from the D/A converter 11, as shown in FIG. 4, tile contrast adjusting circuit 12 will start adjusting the contrast level of the video signal so as to coincide with the set value and the video signal in which the contrast level has risen with the start of the adjusting operation of the contrast adjusting circuit 12 will be given to the driving circuit 3. The video signal from the driving circuit 3 will be applied to the cathode electrode 4a and the video will be displayed on the screen of the picture tube 4.

As explained above, according to the video muting apparatus of the present invention, the reduction of the video quality caused by the deterioration of the cathode electrode can be prevented without reducing the rising performance until the video is displayed in the picture tube.

As many apparently widely different embodiments of this invention may be made without departing from the spirit and scope thereof, it is to be understood that the invention is not limited to the specific embodiments thereof except as defined in the appended claims.

What is claimed is:

1. A video muting apparatus which is used in a television receiver having a picture tube in which a cathode electrode begins heating upon receipt of a power source signal input to when a video signal is input into said picture tube, comprising:

a first counting means for determining an amount of input time between when said power source signal is input into said television received and a power source signal interruption:

a second counting means for determining an amount of interrupt time between when said power source signal interruption in said television receiver occurs and when another power source signal is input; and a controlling means for calculating a video muting time based on a correlation between said amount of input time determined by said first counting means and said amount of interrupt time determined by said second counting means, and for controlling said video signal input operation so that input of said video signal to said picture tube may be stopped from when said power source signal is initially input into said television receiver until when said video muting time elapses.

2. A video muting apparatus according to claim 1 characterized in that, when the power source inputting time counted by said first counting means is represented by T1, the power source interrupting time counted by said second counting means is represented by T2, the maximum allowable time taken from the power source input into said television receiver until the video signal feed to said picture tube starts is represented by K, said video muting time is represented by TM, and wherein the power source inputting time T1 and the power source interrupting time T2 are related by following formula (1), and wherein said video muting time TM is determined by following formula (2):

$$\{\text{Log } 2\ (T1) - \text{Log } 2\ (T2)\} \geqq 0 \quad (1)$$

$$TM = K - \{\text{Log } 2\ (T1) - \text{Log } 2\ (T2)\} \quad (2)$$

and, when the power source inputting time T1 and the power source interrupting time T2 are related by following formula (3), said video muting time TM is determined by following formula (4):

$$\{\text{Log } 2\ (T1) - \text{Log } 2\ (T2)\} < 0 \quad (3)$$

$$TM = K \quad (4)$$

* * * * *